United States Patent [19]
Harris et al.

[11] Patent Number: 5,455,708
[45] Date of Patent: Oct. 3, 1995

[54] PASSIVE SCAN ANGLE DOUBLING OPTICAL SYSTEM

[75] Inventors: Ellis D. Harris, Claremont; James M. Wilson, Glendora, both of Calif.

[73] Assignee: Xerox Corporation, Stamford, Conn.

[21] Appl. No.: 357,881

[22] Filed: Dec. 19, 1994

[51] Int. Cl.$^6$ .............................. G02B 26/08; G02B 5/18
[52] U.S. Cl. .................. 359/226; 359/196; 359/205; 359/212; 359/223; 359/570; 359/572
[58] Field of Search ........................... 359/196, 197, 359/201, 205, 206, 207, 208, 212, 216, 217, 218, 219, 223, 226, 17, 558, 570, 572, 574; 358/474; 250/230, 236

[56] References Cited

U.S. PATENT DOCUMENTS

| | | | |
|---|---|---|---|
| 3,973,826 | 8/1976 | Lobb | 359/203 |
| 4,846,552 | 7/1989 | Veldkamp et al. | 359/572 |
| 4,895,790 | 1/1990 | Swanson et al. | 430/321 |
| 5,266,796 | 11/1993 | Leviton | 250/231.18 |

OTHER PUBLICATIONS

W. Veldkamp & T. McHugh, "Binary Optics", *Scientific American*, vol. 266, No. 5, May 1992, pp. 92–97.
G. J. Swanson, "Binary Optics Technology:The Theory and Design of Multi–Level Diffractive Optical Elements", Lincoln Laboratory, Massachusetts Institute of Technology, *Technical Report 854*, 14 Aug. 1989.

*Primary Examiner*—Paul M. Dzierzynski
*Assistant Examiner*—Darren Schuberg
*Attorney, Agent, or Firm*—William Propp

[57] ABSTRACT

A scan angle doubling system using a rotating cylindrical drum with reflective binary diffractive optical element facets, a cylindrical mirror, and a lens to increase the scanning angle available from a rotating mirror polygon of a given size. The properties of the passive components are such that the output light beam from the reflective binary diffractive optical element facets of the rotating cylindrical drum is collimated and normal to the rotating cylindrical drum. The cylindrical drum, cylindrical mirror, and lens are arranged such that the rotating cylindrical drum and the cylindrical mirror are opposed to each other and separated by a distance greater than the sum of the radius of curvature of the cylindrical mirror plus the focal length of the lens, and the lens is interposed between the rotating cylindrical drum and the cylindrical mirror so that the center of the radius of curvature of the cylindrical mirror and the focal point of the lens means are coincident.

10 Claims, 8 Drawing Sheets

PASSIVE SCAN ANGLE DOUBLING OPTICAL SYSTEM

CROSS-REFERENCE TO RELATED APPLICATIONS

This application contains subject matter that is related to subject matter of patent application Ser. No. (X08/298097), and patent application Ser. No. (X08/358287), both assigned to the same assignee herein and both herein incorporated by reference.

BACKGROUND OF THE INVENTION

This invention relates to a facet tracking optical scanning systems and, more particularly, to a scan angle doubling optical system with a reflective binary diffractive optical element used as the rotating scanning element.

The prior art raster output scanning system 10 of FIG. 1 consists of a pre-polygon mirror optical section 12, a rotating polygon mirror scanning element 14 comprising a plurality of reflective facets 16, and a post-polygon mirror optical section 18 to correct for wobble of the rotating polygon mirror and to focus the beam along a scan line.

A light source 20, such as a laser, emits a coherent beam 22 of a single wavelength which is collimated by a collimating lens 24. The collimated beam then passes through a cross-scan cylindrical lens 26. The lens 26 may be cylindrical in the cross-scan plane and plano in the scan plane. Thus, the lens converges the cross-scan portion of the beam focusing it on a reflective facet 16 of the rotating polygon mirror 14 but allows the scan portion of the beam to remain collimated when the beam strikes the reflective facet.

The collimating lens 24 and the cross-scan cylindrical lens 26 are the only optical elements in the pre-polygon mirror optical section 12.

The polygon mirror 14 is rotated around its axis of rotation by a conventional motor (not shown), known to those of ordinary skill in the art. The polygon mirror is typically mounted on grease or air bearings (also not shown).

The beam 22 reflected from the facet 16 is still collimated in the scan plane and is now diverging in the cross-scan plane. After reflection from the reflective facet, the beam then passes through a f-theta scan lenses 28 consisting of a negative plano-spherical lens 30 and a positive plano-spherical lens 32. This f-theta scan lenses configuration has sufficient barrel distortion to produce a linear scan beam which then passes through a cross-scan cylindrical lens 34.

The lens 34 may be cylindrical in the cross-scan plane and plano in the scan plane. The cross-scan cylindrical lens will flatten the cross-scan field curvature of the beam from the f-theta lens while the f-theta scan lens together with the cross-scan cylinder lens produces a linear, flat-field scan beam. The f-theta lenses 28 are designed with the cross-scan cylindrical lens 34 because the cross-scan cylindrical lens may contribute a small, but non-negligible, amount of distortion, especially at large scan angles.

After passing through the cross-scan cylindrical lens 34, the beam is then reflected off a cylindrical wobble correction mirror 36 to a scan line 38.

The post-rotating scanning element optical section 18 consists of the f-theta scan lenses 28, the cross-scan cylindrical lens 34 and the cylindrical wobble correction mirror 36.

Optical scanner performance is determined by the physical limitations on the speed at which the polygon mirror is rotated, by the angular deflection of the laser beam achieved by reflection from a facet from the rotating polygon mirror, the size of the facets, and the width of the beam being scanned where it is incident on the rotating polygon mirror.

One method for increasing scanning speeds is the use of angle doubling with small sized polygon mirror assemblies. For an "F-THETA" scan lens, commonly employed in optical scanners, the scanned distance on the photoreceptor is the product of the scan angle (THETA) and the effective focal length (F). Whenever the scan angle can be increased, the effective focal length can be decreased. A decrease in the effective focal length brings two primary advantages. First, the smaller focal length translates directly into a smaller physical casting, or base upon which the optical scanning system components are mounted. Lens elements, mirrors and all other components can be smaller. The result is a smaller, lighter, less costly product. Second, the shorter focal length requires a smaller beam at the rotating polygon, further reducing the sizes of the optical and mechanical components of the optical scanning system.

A further advantage resulting from scan angle doubling is any given scan distance along the photoreceptor can be achieved with only half the polygon mirror angular rotation. By this means, the polygon mirror speed of rotation is significantly reduced, allowing lighter, smaller and less costly motor bearings as well as a longer bearing lifetime and better overall performance.

Scan angle doubling devices are known in the art and have been described as in U.S. Pat. No. 3,973,826 by Lobb which describes a device for passive facet tracking and angle doubling.

Lobb describes two scan angle doubling configurations. The first comprises a rotating mirror which reflects light into a static optical system. The static optical system reflects the received light back onto the rotating mirror. The static optical system is comprised of single system consisting of a roof prism and a field lens or a plurality of static optical systems arranged in an arc in the scanning area, each system comprising a roof prism and a field lens.

In the Lobb patent, the beam is not collimated at the scanner facet in the scanning plane, thus any variation in radius between the facets will translate into scanning errors on the scanning plane. In a laser printing application, these scanning errors show up as pixel placement errors visible on a printed page. When the scanned beam is collimated, in the scan plane at the scanner facet, polygon manufacturing tolerances can be relaxed with resultant cost savings.

In the Lobb patent, the beam is not focused on the scanner facet in the cross-scan plane. As a consequence, pyramidal errors in the scanner facet and bearing wobble will result in variable spacing between scan lines. In a laser printing application, these errors show up on the printed page as differences in spacing between the printed lines. Even very small differences are apparent, producing unacceptable output quality. When the beam is focused on the scanner facet in the cross-scan plane, pyramidal errors may be optically removed by focussing the beam from the facet onto the scan line. Again, polygon mirror manufacturing tolerances can be relaxed with resultant cost savings and no loss in print quality.

The propagation of a light beam can be changed by three basic means: reflection by a mirror, refraction by a lens and diffraction by a grating. Optical systems traditionally rely on reflection and refraction to achieve the desired optical transformation. Optical design, based on mirror and lens elements, is a well-established and refined process. Until recently, the problems with diffraction and fabricating high efficiency diffractive elements have made diffractive elements unfeasible components of optical systems.

The diffractive process does not simply redirect a light beam. Diffraction, unlike refraction and reflection, splits a light beam into many beams—each of which is redirected at a different angle or order. The percentage of the incident light redirected by the desired angle is referred to as the diffraction efficiency. The diffraction efficiency of a diffractive element is determined by the element's surface profile. If the light that is not redirected by the desired angle is substantial, the result will be an intolerable amount of scatter in the image or output plane of the optical system.

Theoretically, diffractive phase elements can achieve 100 percent diffraction efficiency. To achieve this efficiency, however, a continuous phase profile is necessary. The theoretical diffraction efficiency of this surface profile is also relatively sensitive to a change in wavelength. By contrast, refractive and reflective elements are relatively insensitive to changes in wavelength. The technology for producing high quality, high efficiency, continuous phase profiles does not presently exist.

A compromise that results in a relatively high diffraction efficiency and ease of fabrication is a multi-level phase grating. The larger the number of discrete phase levels, the better the approximation of the continuous phase function. These multi-level phase profiles can be fabricated using standard semiconductor integrated circuit fabrication techniques.

As disclosed in *Binary Optics Technology: The Theory and Design of Multi-level Diffractive Optical Elements* by G.J. Swanson of the Lincoln Laboratory at the Massachusetts Institute of Technology, (Technical Report 854, Aug. 14, 1989) and the resulting U.S. Pat. No. 4,895,790, a fabrication process starts with a mathematical phase description of a diffractive phase profile and results in a fabricated multi-level diffractive surface. The first step is to take the mathematical phase expression and generate from it a set of masks that contain the phase profile information. The second step is to transfer the phase profile information from the masks into the surface of the element specified by the optical element design.

The first step involved in fabricating the multi-level element is to mathematically describe the ideal diffractive phase profile that is to be approximated in a multi-level fashion. The next step in the fabrication process is to create a set of lithographic masks which are produced by standard pattern generators used in the integrated circuit industry.

A substrate of the desired material, such as Ge, ZnSe, Si, and $SiO_2$, is coated with a thin layer of photoresist. A first lithographic mask is then placed in intimate contact with the substrate and illuminated from above with an ultraviolet exposure lamp. Alternately, pattern generators, either optical or electron beam, can expose the thin layer of photoresist. The photoresist is developed, washing away the exposed resist and leaving the binary grating pattern in the remaining photoresist. This photoresist will act as an etch stop.

The most reliable and accurate way to etch many optical materials is to use reactive ion etching. The process of reactive ion etching anisotropically etches material at very repeatable rates. The desired etch depth can be obtained very accurately. The anisotropic nature of the process assures a vertical etch, resulting in a true binary surface relief profile. Once the substrate has been reactively ion etched to the desired depth, the remaining photoresist is stripped away, leaving a binary phase surface relief grating.

The process may be repeated using a second lithographic mask having half the period of the first mask. The binary phase element is recoated with photoresist and exposed using the second lithographic mask which has half the period of the first mask. After developing and washing away the exposed photoresist, the substrate is reactively ion etched to a depth half that of the first etch. Removal of the remaining photoresist results in a 4 level approximation to the desired profile. The process may be repeated a third and fourth time with lithographic masks having periods of one-quarter and one-eighth that of the first mask, and etching the substrates to depths of one-quarter and one-eighth that of the first etch. The successive etches result in elements having 8 and 16 phase levels. More masks than four might be used, however, fabrication errors tend to predominate as more masks are used.

This process is repeated to produce a multilevel phase relief structure in the substrate. The result is a discrete, computer-generated structure approximating the original idealized diffractive surface. For each additional mask used in the fabrication process, the number of discrete phase levels is doubled, hence the name "binary" optical element or, more precisely, a binary diffractive optical element.

After only four processing iterations, a 16 phase level approximation to the continuous case can be obtained. The process can be carried out in parallel, producing many elements simultaneously, in a cost-effective manner.

A 16 phase level structure achieves 99 percent diffraction efficiency. The residual 1 percent of the light is diffracted into higher orders and manifests itself as scatter. In many optical systems, this is a tolerable amount of scatter. The fabrication of the 16 phase level structure is relatively efficient due to the fact that only four processing iterations are required to produce the element.

After the first etching step, the second and subsequent lithographic masks have to be accurately aligned to the existing pattern on the substrate. Alignment is accomplished using another tool standard to the integrated circuit industry, a mask aligner.

As noted, the photoresist on the substrate can be exposed with an electron-beam pattern generator. The e-beam direct-write process eliminates masks and their corresponding alignment and exposure problems. Binary optics have also been reproduced using epoxy casting, solgel casting, embossing, injection molding and holographic reproduction.

Binary optical elements have a number of advantages over conventional optics. Because they are computer-generated, these elements can perform more generalized wavefront shaping than conventional lenses or mirrors. Elements need only be mathematically defined: no reference surface is necessary. Therefore, wildly asymmetric binary optics are able to correct aberrations in complex optical systems, and elements can be made wavelength-sensitive for special laser systems.

The diffractive optical elements are generally thinner, lighter and can correct for many types of aberrations and distortions. It is possible to approximate a continuous phase profile with a stepwise profile of discrete phase levels.

Binary diffractive optical elements are typically transmissive optical elements. However, binary diffractive optical elements can be reflective optical elements.

The prior art reflective binary diffractive optical element 40 (as taught in U.S. Pat. No. 4,846,552, herein incorporated by reference) of FIG. 2, of a blazed grating, has a surface relief phase grating structure 42 on a substrate 44. The individual blazed gratings of the surface relief structure 42 of the phase grating 40 have a grating period P, and a grating depth H. The surface relief grating 42 itself is formed by a photoresist 46 deposited upon the substrate 44 and a reflective coating 48 deposited upon the photoresist 46.

In this example, the diffraction orders of a beam reflected from a reflective binary diffractive optical element can be made to disappear, except for the first and zeroth order beams into the substrate material. The zeroth order beam can be suppressed independently by control of the relief depth of the binary diffractive surface relief pattern. These suppressed or evanescent orders will redistribute most of their energy into the remaining propagating and radiative orders. These gratings of the reflective binary diffractive optical element behave in a blaze-like or single diffraction order manner. First order diffraction efficiencies of nearly 100 percent can be achieved by proper calculation and selection of the period, width and depth of the grating structure 42.

By way of contrast, transmissive binary diffractive optical elements have typical grating depths of about $\lambda/(n-1)$, n being the refractive index, while reflective diffractive optical elements have typical grating depths of about $\lambda/2$.

There are, however, practical constraints on the use of a multi-faceted rotating polygon mirror as the scanning element in a raster output scanning system.

One limitation on the speed of a raster scanning system is the maximum polygon mirror rotation speed. It can be appreciated that high quality images require precision placement of the raster scan lines as well as exact timing to define the location of each picture element or pixel along each scan. In a conventional polygon mirror scanner, this precision is achieved by holding very close mechanical tolerances on the polygon mirror geometry and on the rotational bearings supporting the polygon mirror and drive motor. Experience has shown that beyond about 20,000 RPM, precision ball bearings with the required closeness of fit have limited life and are impractical in many scanner applications. As a result, alternatives such as air bearings are sometimes used, but these represent a substantial increase in engineering complexity and maintenance, and hence cost.

The high speed necessary to rotate the polygon mirror can cause deformation of the facets due to centrifugal force with a resulting degradation of the light beam reflected from the deformed facet.

A polygon is not the ideal geometric figure to rotate. The edges of the polygon facets cause drag as they rotate mandating a corresponding increased motor speed and power. Additionally, a rotating polygon is acoustically noisy which serves to degrade an office environment.

The air turbulence of the rotating polygon with its facet edges increases the possibility of contamination of the mirrored facets, increases the load on the bearings, and increases the chance of wobble of the polygon and misalignment of the mirror facets with the light beams.

Multi-faceted polygon mirrors are precision optical elements and as such are expensive and time-consuming to mass produce in quality and quantity.

The present invention uses anamorphic optics to collimate the beam in the scan plane at the scanning facet and to focus the beam in the cross-scan plane at the scanning facet so that errors produced by radial and pyramidal variations of the scanning facets may be substantially reduced or easily corrected to provide for improved scanning.

It is an object of this invention to provide a scan angle doubling optical system with a reflective binary diffractive optical element used as the rotating scanning element.

SUMMARY OF THE INVENTION

In accordance with the present invention, a scan angle doubling optical system uses passive optical components to increase the scanning angle available from a rotating polygon mirror of a given size, along with a reflective binary diffractive optical element as the rotating polygon mirror facet. Following a first angular deflection from a reflective binary diffractive optical element facet of a rotating cylindrical drum, a laser beam is returned by reflection to the facet in such a manner that, upon reflection a second deflection adds in the scan plane, thus effectively achieving twice the scan angle for any given polygon rotation. In the cross-scan plane, however, the beam is returned to the facet in such a manner that any beam deflection from the first reflection is canceled by the second reflection. In the scan plane, beam collimation is maintained at the facet, allowing relaxation of certain manufacturing tolerances. In the cross-scan plane, the beam is focussed upon the facet allowing the relaxation of additional polygon manufacturing tolerances.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
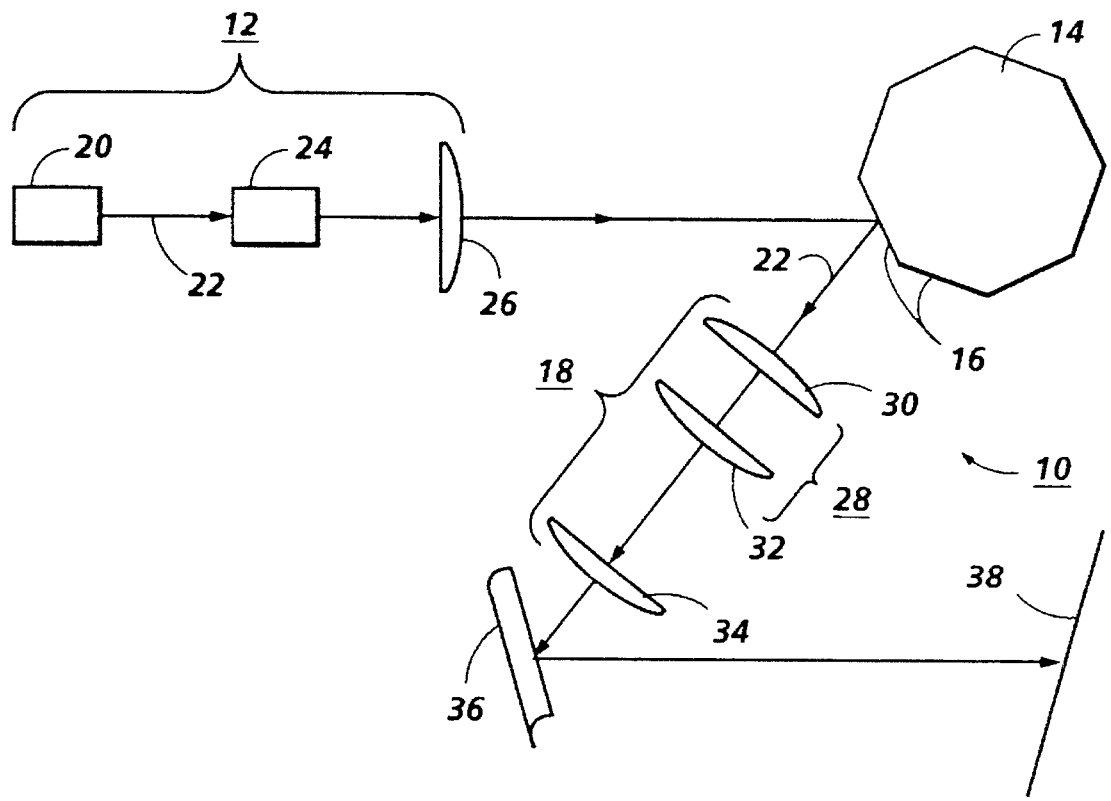
FIG. 1 is a schematic illustration of the cross-section side view of a prior art optical scanning system.
Figure 2:
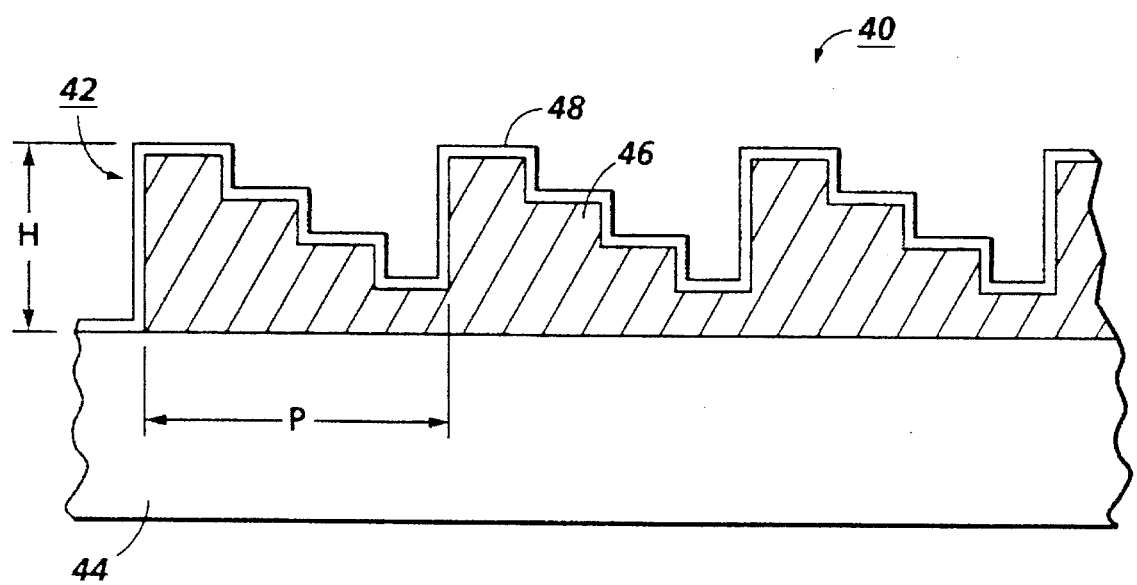
FIG. 2 is a schematic illustration of the cross-section side view of a prior art reflective binary diffractive optical element.
Figure 3:
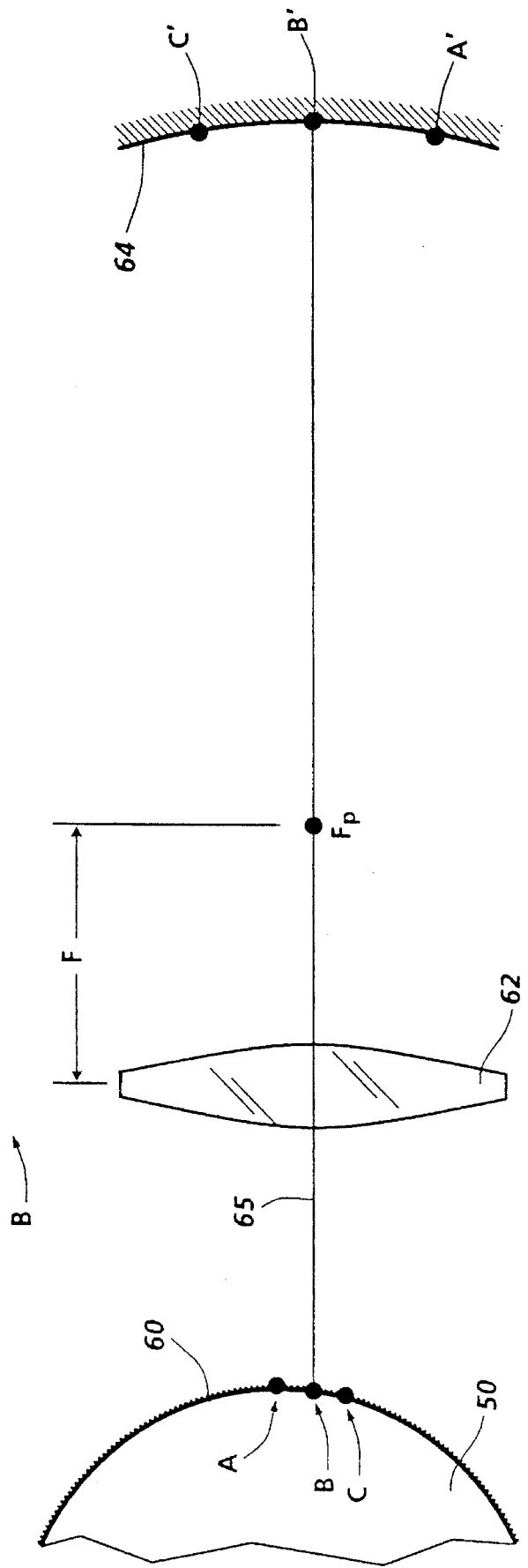
FIG. 3 is a schematic illustration of a cross-section side view in the scan plane of a passive scan angle doubling optical system with a reflective binary diffractive optical element scanning element according to the present invention.

Reference is now made to FIG. 3, wherein there is illustrated a rotating scanning element 50 comprising a repetitive series of reflective binary diffractive optical elements 60 on a cylindrical drum 55 to form a multi-faceted rotating polygon mirror. The series of reflective binary diffractive optical elements 60 are along the circumference of the surface of the drum 55 and perpendicular to the axis of rotation of the cylinder.

For purposes of illustration of a passive scan angle doubling optical system according to the present invention, a reflective binary diffractive optical element facet 60 of a rotating cylindrical drum has three points A, B ,C marked on it. A cylindrical mirror 64 has three conjugate points A', B', C' marked on it. A lens 62 with a focal length F is disposed between the reflective binary diffractive optical element facet 60 and the cylindrical mirror 64. The center of radius of curvature of the cylindrical mirror 64 is coincident with back focal point Fp of the lens 62. The lens 62 images points A, B, C upon conjugate points A', B', C'.

A light ray 65 is reflected from the reflective binary diffractive optical element facet 60 at point B and is focussed at the conjugate point B' on the cylindrical mirror 64. The line B-B' constitutes the optical axis in this segment. The cylindrical mirror 64 is normal to the optic axis line B-B' and therefore returns the light ray 65 to point B on the reflective binary diffractive optical element facet 60. A similar analysis applies to rays reflected from points A and C on reflective binary diffractive optical element facet 60. These properties of the arrangement of the reflective binary diffractive optical element facet 60, the lens 62 and the cylindrical mirror 64 will be used to provide scan angle doubling.

Figure 4:
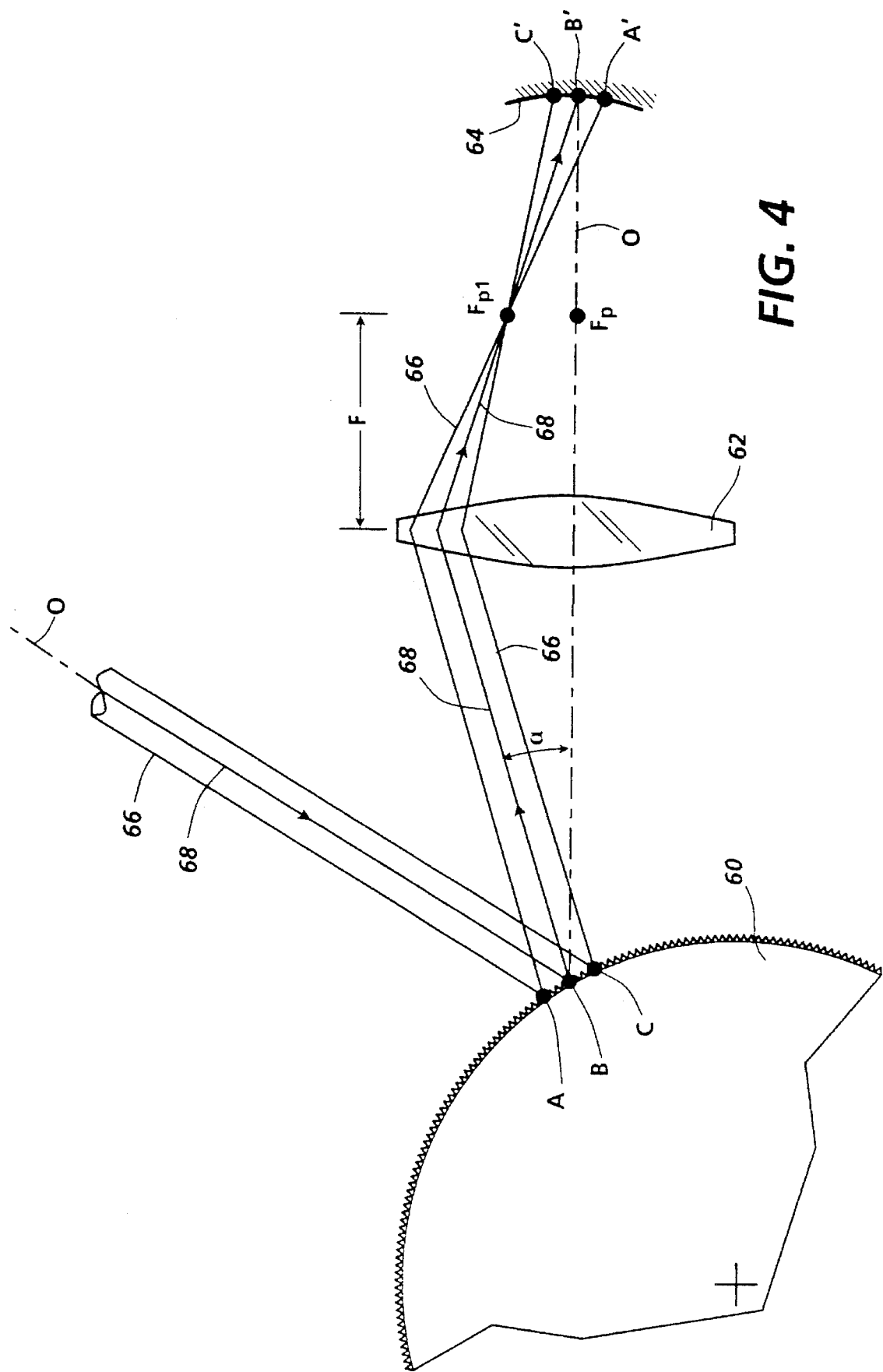
FIG. 4 is a schematic illustration of the passive scan angle doubling optical system with a reflective binary diffractive optical element scanning element shown in FIG. 3 after partial propagation of a light beam.

FIG. 4 shows the same assembly shown in FIG. 3. An incident light beam 66 is reflected by the reflective binary diffractive optical element facet 60 with the angle of reflection determined by the angle of rotation of the reflective binary diffractive optical element facet 60. Angles of reflection refer to the chief ray of ray bundles and are measured relative to the chief ray at the center of scan. The light beam 66 is collimated in the scan plane. Upon reflection, the light beam 66 is reflected by an angle $\alpha$ (a relative difference) becoming reflected beam 66. The reflected angle $\alpha$ results from a polygon rotation angle of $\alpha/2$.

The reflected beam 66, including chief ray 68, passes through the lens 62 and is focused at a focus point $f_{p1}$ following which it diverges and is incident upon the cylindrical mirror 64. Because the light beam 66 is reflected from points on the reflective binary diffractive optical element facet 60 to the conjugate points on the cylindrical mirror 64, the parts of the light beam 66 which are reflected from point A are reflected to point A' on the cylindrical mirror 64, the parts of the light beam 66 reflected from point B are reflected to point B'(this is the chief ray 68), and the parts of light beam 66 reflected from point C are reflected to point C'.

Figure 5:
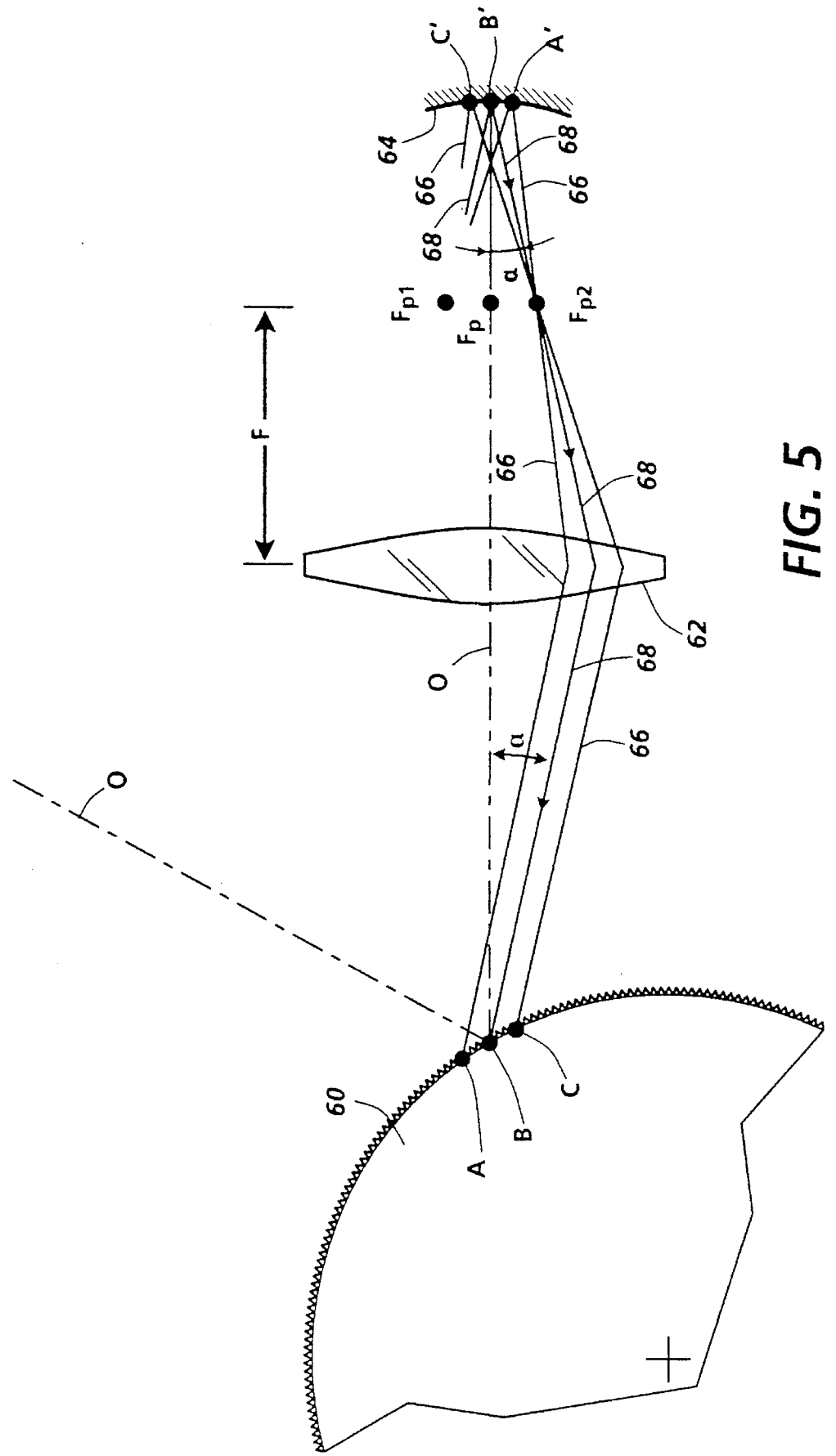
FIG. 5 is a schematic illustration of the passive scan angle doubling optical system with a reflective binary diffractive optical element scanning element shown in FIG. 4 after further propagation of the light beam.

FIG. 5 shows the same assembly shown in FIGS. 3 and 4 after the light beam 66 is reflected from the cylindrical mirror 64 and returns to the facet 60 through an optical path including focal point $f_{p2}$ and lens 62. At the facet 60 the light beam 66 is reflected in a direction which adds to the total deflected angle $\beta$ which is equal to 2 $\alpha$. If the light beam 66 were to simply retrace its path, returning by way of focal point $f_{p1}$, two angular deflections from the reflective binary diffractive optical element facet 60 would subtract and cancel each other out. The laser beam would simply return to its source through a path including pre-polygon optics 12. Since the light beam 66 is reflected by the same angle but in the opposite direction, the two angular deviations caused by the two reflections from the facet will add together.

Therefore, the beams of the light beam 66 are reflected from the conjugate points A', B' and C' and returned to a focus at focus point $f_{p2}$. The focus point $f_{p1}$ and focus point $f_{p2}$ are displaced from each other symmetrically about the optic axis B-B'. The displacement is determined by the reflected angle $\alpha$ of the light beam 66 when it is reflected from the reflective binary diffractive optical element facet 60. The light beam 66 then passes through the lens 62 and results in a collimated ray bundle striking the reflective binary diffractive optical element facet 60 at an angle equal to twice the single reflection angle $\alpha$, since deflections at each reflection from the facet 60 add the net deflection following the two reflections. The resultant angle $\beta$ is four times the angle of polygon rotation.

Figure 6:
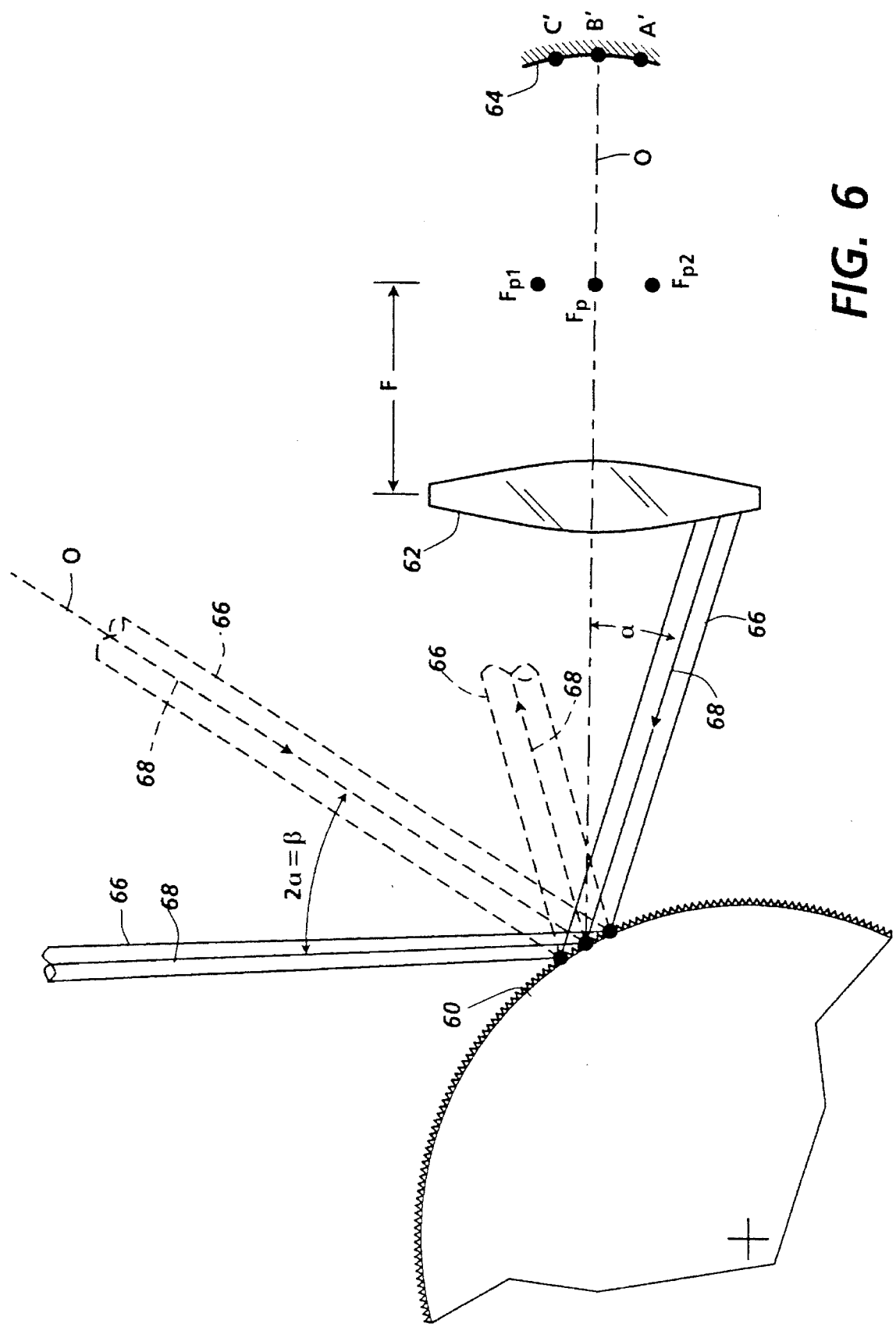
FIG. 6 is a schematic illustration of the passive scan angle doubling optical system with a reflective binary diffractive optical element scanning element shown in FIG. 5 after further propagation of the light beam.

FIG. 6 shows the same assembly shown in FIGS. 3, 4 and 5, after the collimated ray bundle forming the light beam 66 is reflected a second time from the reflective binary diffractive optical element facet 60. The reflected light beam 66 is reflected at an angle $\beta$ which is twice angle $\alpha$, the angle of the first reflection from the reflective binary diffractive optical element facet 60 (earlier reflection shown in dotted lines), and four times the angle of polygon rotation which is $\alpha/2$. The light beam 66 now exits the assembly. The light beam 66, which was focussed at focal point $f_{p2}$, is collimated by lens 62 in the scan plane. Scan plane collimation at the polygon is thus preserved by the passive scan angle doubling optics.

This method of scan angle doubling is not limited to two reflections from the reflective binary diffractive optical element facet 60. The light beam 66 can make several round trips between the reflective binary diffractive optical element facet 60 and the cylindrical mirror 64. Each time the light beam 66 returns to the reflective binary diffractive optical element facet 60 to be reflected, it will be reflected by an additional amount equal to angle $\beta$ or twice angle $\alpha$. This would result in scan angle multiplication of the original beam angle.

Figure 7:
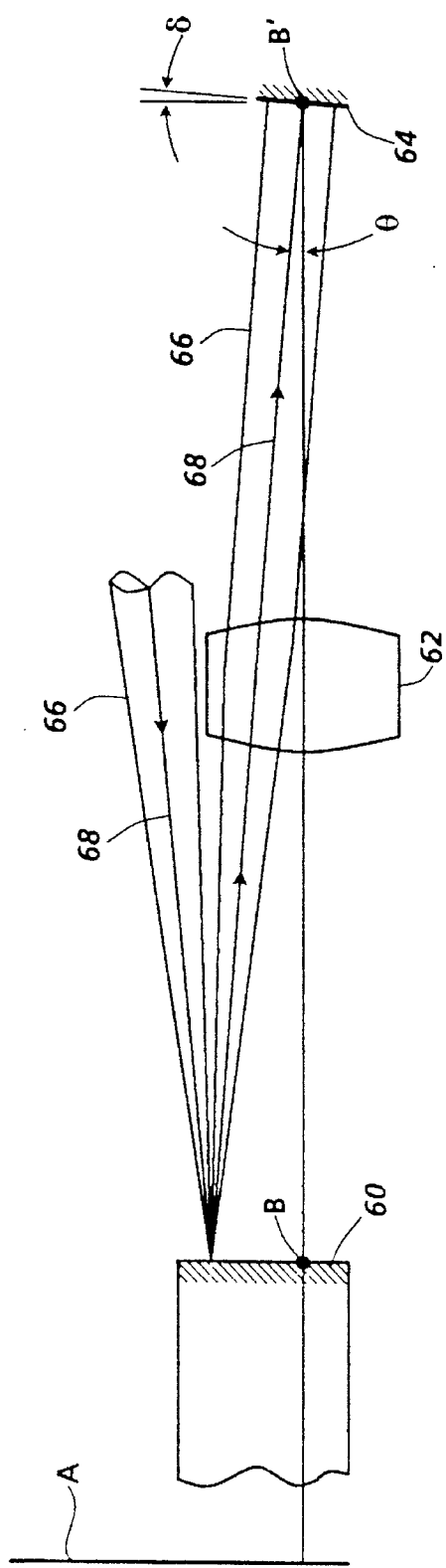
FIG. 7 is a schematic illustration of a cross-section side-view in the cross-scan plane of a passive scan angle doubling optical system with a reflective binary diffractive optical element scanning element after partial propagation of a light beam.
Figure 8:
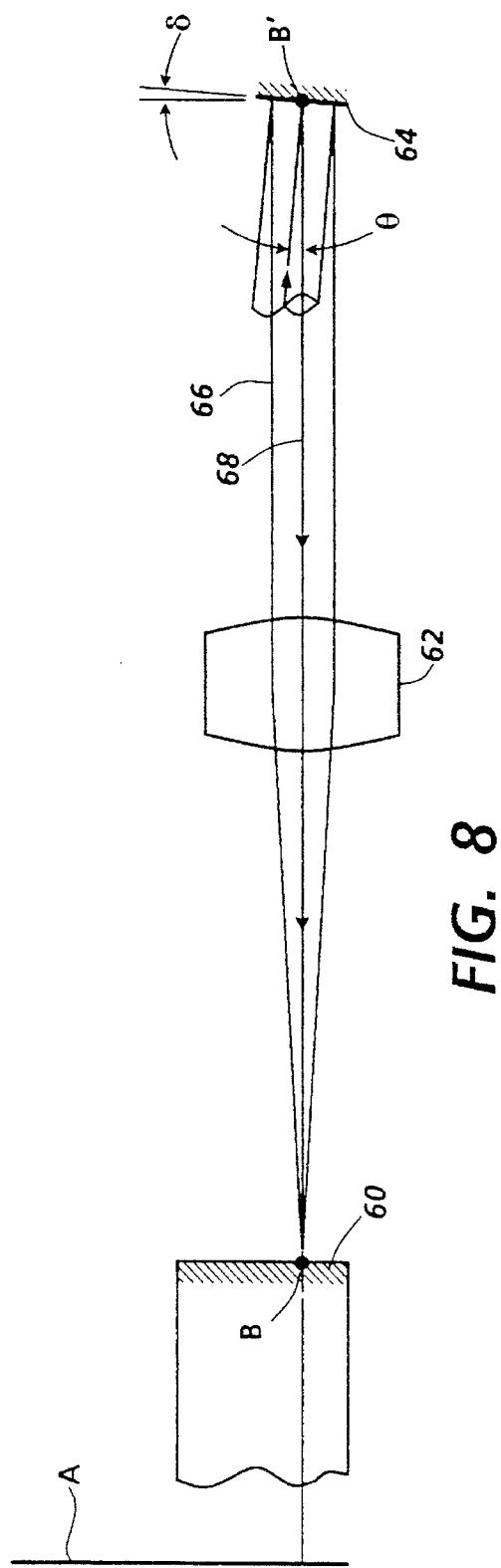
FIG. 8 is a schematic illustration of a cross-section side-view in the cross-scan plane of a passive scan angle doubling optical system with a reflective binary diffractive optical element scanning element shown in FIG. 7 after further propagation of the light beam.
Figure 9:
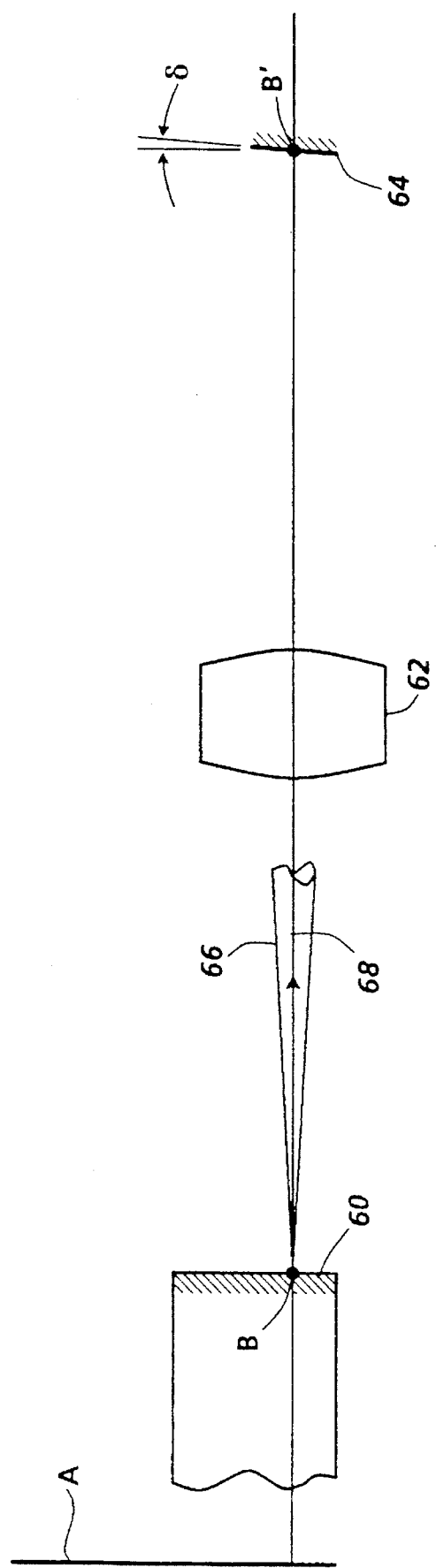
FIG. 9 is a schematic illustration of a cross-section side-view in the cross-scan plane of a passive scan angle doubling optical system with a reflective binary diffractive optical element scanning element shown in FIG. 8 after further propagation of the light beam.

FIGS. 7, 8 and 9 show the same assembly shown in FIGS. 4, 5 and 6 in a cross-scan view rather than a scan view and show how the assembly can be used to preclude scan line bow. The reflective binary diffractive optical element facet 60 has a rotating drum assembly axis A.

Scan line bow is caused when the light beam 66 is not perpendicular to the rotating drum assembly axis A. An alteration to the cylindrical mirror 64 can insure that the light beam 66 is perpendicular to the drum axis A and therefore eliminate scan line bow, as shown in FIGS. 7 to 9.

As shown in FIG. 7, the light beam 66 from the light source is focussed upon the reflective binary diffractive optical element facet 60. The light beam 66 is then reflected by the reflective binary diffractive optical element facet 60 as a diverging beam. After light beam 66 passes through the lens 62, which is an anamorphic lens of lower optical power in the cross-scan plane than in the scan plane, the light beam 66 travels towards the cylindrical mirror 64 as a collimated beam in the cross-scan plane.

As shown in FIG. 8, the light beam 66 is then reflected by the cylindrical mirror 64 while maintaining its collimation. The light beam 66 then passes again through the lens 62 where it refocused on the reflective binary diffractive optical element facet 60. Alternately, the incident light beam 66 could be collimated in both planes at its first reflection with the facet 60. The anamorphic lens 62 would then bring the light beam 66 to a focus at its final reflection from facet 60. This return trip contributes to or eliminates scan line bow. If the light beam 66 is perpendicular to the drum axis A on this return trip, then scan line bow will be eliminated.

To correct for scan line bow, an angle α between the chief beam 68 of the light beam 66 and an optic axis B-B' between the cylindrical mirror 64 and the rotating drum axis A and which is perpendicular to the drum axis A must be measured. To insure that the chief ray 68 is parallel to the optic axis B-B' and perpendicular to the polygon mirror axis A, the cylindrical mirror 64 must be tilted by an angle δ which is equal to ½ of the angle Φ. With this angular tilt, the light beam 66 will approach the reflective binary diffractive optical element facet 60 along the optic axis O and perpendicular to the drum axis A as shown in FIG. 8.

The light beam 66 is reflected from the reflective binary diffractive optical element facet 60 for a second time as shown in FIG. 9. Any pyramidal error or bearing wobble angular error introduced into the light beam 66 in the first reflection from the reflective binary diffractive optical element facet 60, shown in FIG. 7, will be exactly canceled when the light beam 66 is reflected from the reflective binary diffractive optical element facet 60 the second time, as shown in FIG. 9. Unlike the reflections in the scan plane which add to each other, reflections in the cross-scan plane cancel each other out.

The condition of focus on the reflective binary diffractive optical element facet 60 in the cross-scan plane is required at the final reflection for optical wobble correction.

Figure 10:
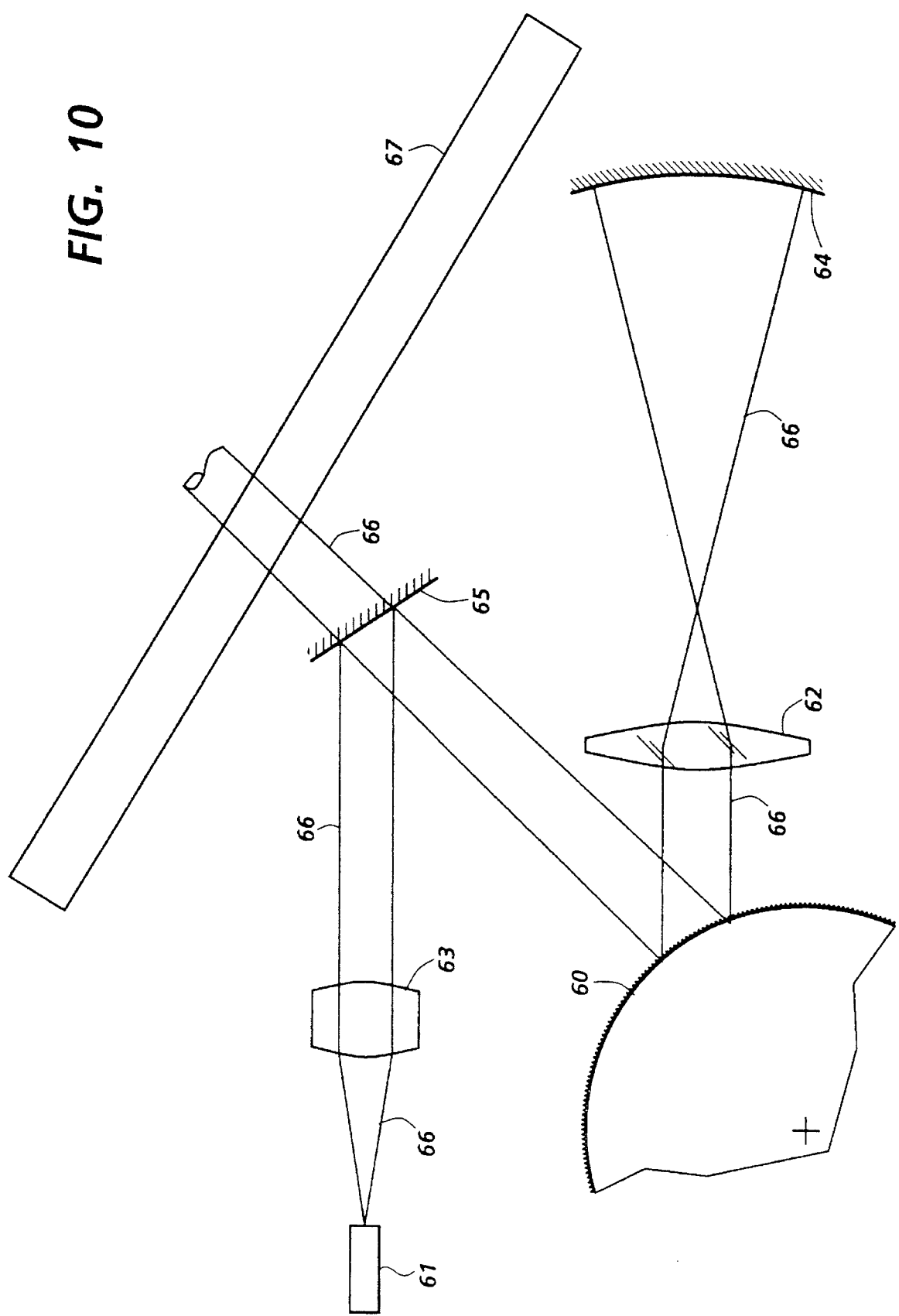
FIG. 10 is a schematic illustration of a cross-section side-view in the cross-scan plane of a passive scan angle doubling optical system with a reflective binary diffractive optical element scanning element shown in FIG. 3 used in a laser scanning system.

FIG. 10 shows the passive scan angle doubling system used in a scanning system including a light source 61, pre-polygon optics 63, a fold mirror 65 to direct the beam 66 towards the reflective binary diffractive optical element facet 60 and post scanning optics 67.

In FIGS. 3 to 10, the lens 62 is shown as a single element lens for illustrative purposes only to describe the concepts. In actual practice, the lens 62 may be a combination lens and may include one or more cylindrical optical elements.

It should be noted that all optical elements are placed to avoid mechanical interferences. Whenever a figure in one view shows an apparent interference, the figure of the structure in another view shows that the elements and beams are actually displaced from each other.

The reflective binary diffractive optical element 60 can be formed upon a cylinder or drum by the photoresist deposition and reflective coating method previously discussed. Alternately, the binary diffractive optical element can be molded or etched into a cylinder of plastic or other soft deformable material. The binary diffractive optical element could also be cast, etched or milled into a cylinder of metal or other hard malleable material. The metal or plastic material of the cylinder can be inherently reflective to the wavelength of the light beam used in the scanning system or the binary diffractive optical element can be coated with a reflective material.

The series of reflective binary diffractive optical elements on the drum will function as the optical equivalent of a multi-faceted polygon mirror as the rotating scanning element of a raster scanning system. Each of the individual reflective binary diffractive optical elements provides an optical function equivalent to an individual flat facet on a polygon mirror as currently used in raster scanning systems.

This embodiment of the invention teaches a one-for-one substitution of the reflective binary diffractive optical element for the multi-faceted polygon mirror as the rotating scanning element in a raster output scanner. All other optical elements within the raster output scanner remain the same except for the rotating scanning element.

The repetitive series of reflective binary diffractive optical elements are only microns above the surface of the cylindrical drum (the figures are shown exaggerated for illustrative purposes).

The benefits of reflective binary diffractive optical elements upon a cylindrical drum as the rotating scanning element in a raster output scanner are less deformation of the reflective surface by centrifugal force with a resulting less degradation of the light beam reflected from the surface.

The reflective binary diffractive optical elements upon a cylindrical drum will have less drag during rotation which, in turn, reduces acoustic noise and reduces drive power for the rotation.

The smaller height of the reflective binary diffractive optical elements upon a cylindrical drum reduces air turbulence during rotation which reduces the possibility of contamination of the reflective element, reduces the wobble of the cylinder and misalignment of the beam with the reflective element.

As a result of the cross-scan wobble correction inherent in the two reflections, the use of a series of reflective binary diffractive optical elements on a rotating cylindrical drum as a scanning element may reduce wobble to negligible amounts, within optical tolerance of the raster scanning system, such that wobble correction may not be needed in the post-rotating scanning element optics. By elimination of the wobble correction function, the optical elements may be fewer in number, less complex optically and more inexpensive.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

We claim:

1. A scan angle doubling system comprising:

A) a rotating cylindrical drum with at least one reflective binary diffractive optical element facet and a normal which is perpendicular to said reflective binary diffractive optical element facet, B) a cylindrical mirror with a scan plane radius of curvature and a center of the radius of curvature, C) a focussing lens means with a focal length and a focal point, D) said rotating cylindrical drum, said cylindrical mirror, and said focussing lens means being arranged such that said rotating cylindrical drum and said cylindrical mirror are opposed to each other and separated by a distance greater than the sum of the radius of curvature plus the focal length, and said focussing lens means being interposed between said rotating cylindrical drum and said cylindrical mirror such that the center of the radius of curvature of said cylindrical mirror and the focal point of said focussing lens means are coincident, and E) said rotating cylindrical drum, said cylindrical mirror, and said focussing lens means being arranged relative to each other to reflect a beam along a first path from said reflective binary diffractive optical element facet, at a first angle measured from the normal, through said focussing lens means to be received by said cylindrical mirror, said cylindrical mirror reflecting the received beam along a second path through said focussing lens means to be received by said reflective binary diffractive optical element facet, said reflective binary diffractive optical element facet reflecting said received beam in a post scan direction, at a second angle measured from the normal which is greater than the first angle.

2. The scan angle doubling system of claim 1 wherein said rotating cylindrical drum, said cylindrical mirror and said focussing lens means are further arranged to substantially maintain beam collimation whenever the beam is reflected from said reflective binary diffractive optical element facet of said rotating cylindrical drum.

3. The scan angle doubling system of claim 1 wherein said focussing lens means is a combination lens.

4. The scan angle doubling system of claim 3 wherein said combination lens uses at least one cylindrical element.

5. The scan angle doubling system of claim 1 wherein the second angle is approximately twice the first angle.

6. A scanning system comprising:

A) a light source for providing a light beam,

B) a first focussing lens means for focussing the light beam,

C) post scan lens means,

D) a photoreceptor medium,

E) scan angle doubling means comprising:
  i) a rotating cylindrical drum with at least one reflective binary diffractive optical element facet and a normal which is perpendicular to said reflective binary diffractive optical element facet,
  ii) a cylindrical mirror with a scan plane radius of curvature and a center of the radius of curvature,
  iii) a second focussing lens means with a focal length and a focal point,
  iv) said rotating cylindrical drum, said cylindrical mirror, and said second focussing lens means being arranged such that said rotating cylindrical drum and said cylindrical mirror are opposed to each other and separated by a distance greater than the sum of the radius of curvature plus the focal length, and said second focussing lens means being interposed between said rotating cylindrical drum and said cylindrical mirror such that the center of the radius of curvature of said cylindrical mirror and the focal point of said second focussing lens means are coincident, and
  v) said rotating cylindrical drum, said cylindrical mirror, and said second focussing lens means being arranged relative to each other to reflect a beam along a first path from said reflective binary diffractive optical element facet, at a first angle measured from the normal, through said second focussing lens means to be received by said cylindrical mirror, said cylindrical mirror reflecting the received beam along a second path through said second focussing lens means to be received by said reflective binary diffractive optical element facet, said reflective binary diffractive optical element facet reflecting said received beam in a post scan direction, at a second angle measured from the normal which is greater than the first angle, F) said light source, said first focussing lens means, and said scan angle doubling means arranged relative to each other such that the light beam from said light source passes through said first focussing lens means and becomes focussed on said reflective binary diffractive optical element facet, and G) said scan angle doubling means, said post scan lens means, and said scanning medium arranged such that the beam reflected in the post scan direction passes through said post scan lens means and is received by said photoreceptor medium.

7. The scanning system of claim 6 wherein said rotating cylindrical drum, said cylindrical mirror and said second focussing lens means are further arranged to substantially maintain beam collimation whenever the beam is reflected from said reflective binary diffractive optical element facet of said rotating cylindrical drum.

8. The scanning system of claim 6 wherein said second focussing lens means is a combination lens.

9. The scanning system of claim 8 wherein the combination lens uses at least one cylindrical element.

10. The scanning system of claim 6 wherein the second angle is approximately twice the first angle.

* * * * *